United States Patent [19]

Blankenship et al.

[11] Patent Number: 5,294,687
[45] Date of Patent: Mar. 15, 1994

[54] LOW MOLECULAR WEIGHT MONOALKYL SUBSTITUTED PHOSPHINATE AND PHOSPHONATE COPOLYMERS

[75] Inventors: Robert M. Blankenship, Harleysville; Scott L. Egolf, Lansdale, both of Pa.

[73] Assignee: Rohm and Haas Company, Philadelphia, Pa.

[21] Appl. No.: 100,862

[22] Filed: Aug. 2, 1993

Related U.S. Application Data

[62] Division of Ser. No. 691,260, Apr. 25, 1991, Pat. No. 5,256,746.

[51] Int. Cl.$^5$ .......................... C08F 2/38; C08F 30/02
[52] U.S. Cl. .......................... 526/233; 526/271; 526/278; 526/318.2; 526/319
[58] Field of Search ............ 526/233, 271, 278, 318.2

*Primary Examiner*—Joseph L. Schofer
*Assistant Examiner*—Fred Zitomer
*Attorney, Agent, or Firm*—David T. Banchik

[57] ABSTRACT

Monoalkyl phosphinate and monoalkyl phosphonate derivatives of low molecular weight water soluble polymers are preferentially prepared by copolymerizing hypophosphorous acid, monoethylenically unsaturated monocarboxylic acid(s) and an effective amount of a $C_3$–$C_8$ monoethylenically unsaturated dicarboxylic acid.

3 Claims, No Drawings

LOW MOLECULAR WEIGHT MONOALKYL SUBSTITUTED PHOSPHINATE AND PHOSPHONATE COPOLYMERS

This is a divisional of application Ser. No. 691,260, filed Apr. 25, 1991, U.S. Pat. No. 5,256,746.

FIELD OF THE INVENTION

This invention relates to low molecular weight monoalkyl phosphinate and monoalkyl phosphonate copolymers, and to an improved process to prepare them.

BACKGROUND OF THE INVENTION

Low molecular weight copolymers, and their salts, are useful as dispersants, scale inhibitors, detergent additives, sequestrants, etc. They can also act as crosslinkers for hydroxyl-containing substrates via esterification reactions or for amine-containing substrates via aminolysis reactions. Generally, molecular weights below 50,000 are necessary for effective performance, and often very low molecular weights, below 10,000, are most effective. It is common to use chain transfer agents in the polymerization reaction to produce low, and especially the very low, molecular weight polymers. Hypophosphorous acid or its salts (commonly sodium hypophosphite) are particularly desirable chain transfer agents, chosen primarily because they introduce phosphinate and phosphonate functionality into polymer molecules which confers superior performance properties in some applications. Phosphorous acid is also known for use as a chain transfer agent, although it is considerably less reactive than hypophosphorous acid. As used hereinafter, and in the appended claims, the term "hypophosphorous acid" is intended to include alkali metal, ammonium and amine salts thereof, unless a clearly different meaning is indicated.

The use of hypophosphorous acid and its benefits have been taught in several U.S. patents. U.S. Pat. No. 2,957,931 teaches the use of hypophosphorous acid to make organo-phosphorus compounds including organophosphorus telomers. U.S. Pat. Nos. 4,046,707, 4,105,551, 4,127,483, and 4,159,946 teach a method of inhibiting the formation of scale-forming salts using acrylic acid telomers made by hypophosphorous acid chain transfer. U.S. Pat. No. 4,621,127 teaches the use of hypophosphorous acid as a decolorizing agent in a polymerization process. Japanese Patent No. 02-34694 teaches the use of hypophosphorous acid chain terminated polymers and copolymers as detergent additives.

The use of hypophosphorous acid as a chain transfer agent results in the formation of several different polymer species. The reaction products include polymeric dialkyl phosphinate, polymeric monoalkyl phosphinate and polymeric monoalkyl phosphonate polymers. For certain applications, it is desirable to have either the di- or mono-alkyl derivative.

U.S. Pat. No. 4,681,686 ('686 patent) discloses cotelomers made using hypophosphorous acid as a chain transfer agent. The cotelomers are prepared from a wide range of comonomer types for use as corrosion and scale inhibitors, dispersants, and sealing smut inhibitors. The '686 patent discloses a preference for the polymeric dialkyl phosphinate products.

U.S. patent application Ser. No. 371,467 filed on Jun. 26, 1989, commonly assigned, teaches a method of increasing the efficiency of the incorporation of the hypophosphorous acid which subsequently results in an increased yield of the di-alkyl phosphinate species. In that application, the invention required from 20–100 percent in-process neutralization of the acid monomers in order to achieve efficient incorporation of the hypophosphorous acid.

SUMMARY OF INVENTION

An object of the present invention is providing a low molecular weight water soluble copolymer composition with high levels of monoalkyl phosphinate and monoalkyl phosphonate copolymers. A further object is to provide a process by which one can obtain a copolymer composition wherein the ratio of the number of monoalkyl substituted phosphinate and phosphonate copolymers to the number of dialkyl substituted phosphinate copolymers is at least 0.7:1.

BRIEF DESCRIPTION OF THE INVENTION

It has been surprisingly found that when using hypophosphorous acid as the chain transfer agent in the polymerization of monoethylenically unsaturated monocarboxylic acids, the use of from 5 to about 90 percent by weight of total monomers of a $C_3$–$C_8$ monoethylenically unsaturated dicarboxylic acid results in increased amounts of the monoalkyl phosphinate and monoalkyl phosphonate moieties. Furthermore, we have found that when using the $C_3$–$C_8$ monoethylenically unsaturated dicarboxylic acids as a comonomer, neutralization of the monocarboxylic acid monomer(s) during polymerization has only a minor effect on the manner in which the phosphorus becomes incorporated into the polymer.

DETAILED DESCRIPTION OF THE INVENTION

The objective of the present invention is to prepare low molecular weight water soluble carboxylic acid based copolymer mixtures wherein the ratio of incorporated phosphorus present as monoalkyl phosphinate and monoalkyl phosphonate moieties to the level of incorporated phosphorus present as dialkyl phosphinate is at least 0.7:1. This objective is obtained by a process wherein a polymer mixture containing polymeric monoalkyl phosphinates and polymeric monoalkyl phosphonates are prepared by polymerizing:

a) hypophosphorous acid,
b) at least one monoethylenically unsaturated monocarboxylic acid or salts thereof,
c) at least one $C_3$–$C_8$ monoethylenically unsaturated dicarboxylic acid, anhydride, salts or $C_1$–$C_4$ monoesters thereof, and optionally
d) a non-carboxylic acid monomer wherein said dicarboxylic acid is used in an amount effective to provide a polymer mixture in which at least 40 percent of the incorporated phosphorus is in the form of polymeric monoalkyl phosphinate and polymeric monoalkyl phosphonate.

Low molecular weight refers to a weight average molecular weight ($M_w$) of less than 50,000, preferably less than 10,000 and most preferably less than 5,000.

The process is aqueous based and can be run in a batch or semicontinuous mode.

Monoethylenically unsaturated monocarboxylic acids useful in this invention include acrylic acid, methacrylic acid, vinyl acetic acid, crotonic acid, acryloxypropionic acid and salts thereof. Preferably, the monoethylenically unsaturated monocarboxylic acid is acrylic acid and is present at from about 10 to about 95 percent and more preferably from about 60 to about 90 percent, based on the total weight of monomer.

The $C_3$-$C_8$ monoethylenically unsaturated dicarboxylic acid comonomers useful for promoting the formation of the monoalkyl phosphinates and monoalkyl phosphonates include maleic acid, itaconic acid, fumaric acid, their salts, anhydrides and $C_1$-$C_4$ monoesters thereof. Preferably, the $C_3$-$C_8$ monoethylenically unsaturated dicarboxylic acid is maleic acid and is present at from about 90 to about 5 percent, more preferably from about 40 to about 10 percent, and most preferably at from about 15 to about 30 percent by weight based on the total weight of monomer.

In addition, non-carboxylic acid monomers may be present at levels where they are soluble in the reaction mixture and the produced polymer is soluble in water. In any case, the non-carboxylic monomer is less than 80 percent and preferably less than 50 percent of the total weight percent of monomer charged. Examples of monoethylenically unsaturated monomers which are not carboxylic acids are alkyl esters of acrylic or methacrylic acid such as methyl, ethyl or butyl acrylate or methyl, butyl or isobutyl methacrylate, hydroxyalkyl esters of acrylic or methacrylic acids, such as hydroxyethyl or hydroxypropyl acrylate or methacrylate, acrylamide, n-alkyl acrylamides, methacrylamide, methylol acrylamide, methylol methacrylamide, phosphoethyl methacrylate, allyl or methallyl alcohols, esters and ethers, acrylonitrile, vinyl acetate, vinyl pyridines, vinyl pyrrolidones, styrene, vinyl sulfonic acid or salts thereof and 2-acrylamido-2-methyl propane sulfonic acid or salts thereof.

The chain transfer agent or chain regulator of the present invention is hypophosphorous acid or a salt thereof, such as sodium hypophosphite monohydrate. The level used will vary with the desired molecular weight. The molecular weight produced is inversely proportional to the level of chain transfer agent. Levels from about 1 percent to about 35 percent by weight based on total monomer or more may be used. Preferably, the hypophosphorous acid is present at a level of from about 2 to about 25 percent by weight, based on the total polymerizable monomers. If desired, phosphorous acid may optionally be included along with the hypophosphorous acid.

Suitable water-soluble thermal initiators include, but are not limited to, hydrogen peroxide, t-butyl hydroperoxide, sodium, potassium or ammonium persulfate, sodium, potassium or ammonium perphosphate and 2,2 azobis (cyanovaleric acid) and its corresponding salts. These are normally used in amounts of 0.05 percent to 5 percent based on the weight of total monomer. A preferred range is from about 0.5 to about 3 percent by weight of total monomer. Water-soluble redox initiators may also be used including, but not limited to, sodium bisulfite, sodium sulfite, isoascorbic acid, sodium formaldehyde sulfoxolate and the like used with suitable oxidizing agents, such as the thermal initiators above. If used, the redox initiators may be used in amounts of 0.05 percent to 8 percent, based on the weight of total monomer. A preferred range is from about 0.5 to about 5 percent by weight of total monomer.

Metal salt activators or promoters may also be added as part of the initiator system. Examples include water soluble salts of cobalt, iron, copper, nickel, zinc, tungsten, cerium, molybdenum, titanium and zirconium. Preferred levels of metal salts are 0-100 ppm, based on weight of total monomer.

In a preferred embodiment, some of the monomers are used in their neutralized form. The monomers may be neutralized prior to the polymerization or during the polymerization. The neutralizing solution may be fed separately, cofed, or fed with one or more of the other feeds. In a preferred embodiment, the $C_3$-$C_8$ monoethylenically unsaturated dicarboxylic acid is partially neutralized before the start of the other feeds. The alkaline neutralizer may be any inorganic or organic base. Among the preferred bases which may be used are sodium hydroxide, potassium hydroxide, ammonium hydroxide, triethanolamine, dimethyl amino ethanol, ethanolamine, and trimethyl hydroxyethyl ammonium hydroxide. The level of neutralizer is preferably 0 to 19.5 percent equivalents based on the acid or anhydride monomer content of the total monomer charges.

Polymerizations are normally run at greater than 20 percent solids (nonvolatile solids in aqueous polymerized product) and preferably in the 40 to 60 percent solids range. Polymerization temperatures are generally between 60° and 120° C., with a preferred range of from 75° to 95° C.

The process requires charging an aqueous solution of the monoethylenically unsaturated dicarboxylic acid to the reactor, preferably under an inert atmosphere such as nitrogen. Each of the remaining reactants, monomer, chain transfer agent, initiator, and alkaline neutralizer if used are then co-fed into the reactor after bringing the reactor contents to the reaction temperature. Preferably, the reactants are added to the stirred reactor contents separately, and at a linear rate, over a period of from about 30 minutes to about 3 hours. Linear feed rate refers to maintaining substantially the same feed rate of reactants during the entire addition period. Preferably, the reactants are added over a period of from about 1 to about 2 hours. In an alternative embodiment of this invention, it may be desirable to have non-linear feeds of the reactants such as, for example, feeding the chain transfer agent quickly in the beginning of the reaction and then slowing the feed down, possibly completing the feed before the other feeds are complete. In a preferred embodiment, the alkaline neutralizer is fed as a separate step before the addition of the other solutions. In a batch process, the polymerization is conducted until all ingredients have been added and polymerization is complete. If residual monomer levels are higher than desired, a longer hold period may be employed with optional addition of more initiator or other suitable monomer scavengers.

The initiator, chain transfer agent and alkaline neutralizer are normally added as aqueous solutions for simplicity and accuracy of metering and more uniform reaction. The reactants can be fed separately although some preblending may be practiced; blending of monomers or preneutralizing the acid monomer are examples of alternative modes by the present invention.

The fate of the hypophosphorous acid in the polymerization reaction can be one of several products. The reaction products formed are a mixture of species. NMR analysis indicates the relative amounts of each of the following:

A— INCORPORATED: Polymeric

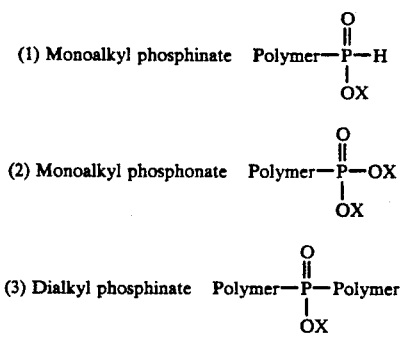

B— NOT INCORPORATED: Inorganic

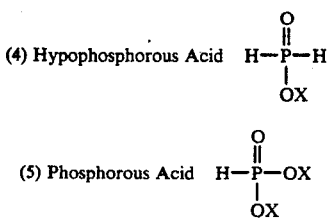

where X is hydrogen, or an alkali, ammonium or amine cation.

The ratio of the species present in the reaction mixture is a function of the process employed. As illustrated by the examples, the processes which employ from 5 to about 90 percent by weight of total polymerizable monomer of a $C_3$–$C_8$ monoethylenically unsaturated dicarboxylic acid as a comonomer have greater than 40 percent of the incorporated phosphorus present as the monoalkyl phosphinate and monoalkyl phosphonate, preferably greater than 50 percent and most preferably greater than 60 percent. Incorporated phosphorus refers to species of the type 1, 2 or 3 above wherein the hypophosphorous acid has taken part in the polymerization reaction. In the examples below, a mono- to di-ratio is given which represents the relative number of molecules wherein the phosphorus has been incorporated as a monoalkyl phosphinate or monoalkyl phosphonate to the number of molecules wherein the phosphorus has been incorporated as a dialkyl phosphinate.

As will be illustrated in the examples given hereinafter, at least 40 percent of the incorporated phosphorus is present as a monoalkyl phosphinate or monoalkyl phosphonate, i.e. the polymer mixtures have a mono- to di-ratio of at least 0.7:1. The polymer mixtures are therefore improved over those available heretofore by the prior art processes. Under the preferred conditions of the invention, depending upon the amount of hypophosphorous acid, the temperature of the polymerization and the amount of the $C_3$–$C_8$ monoethylenically unsaturated dicarboxylic acid present, the monoalkyl phosphinates and monoalkyl phosphonates will represent at least 40 percent of the incorporated phosphorus.

The following specific examples are intended to illustrate various embodiments of the invention but are not intended to otherwise limit the scope of the broader aspects of the invention.

EXAMPLE 1

666.9 grams of deionized water and 225 grams of maleic anhydride were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 40° C. An initiator promoter solution was prepared by dissolving 0.04 grams of iron sulfate to 40.0 grams with deionized water. The promoter solution was then added to the reactor. 184 grams of a 50 percent by weight sodium hydroxide solution was added to the stirred reactor over five minutes. The exotherm resulting from the neutralization of the maleic anhydride raised the temperature of the reactor contents to 80° C. The reaction mixture was further heated to 90° C. Three cofeed solutions were prepared: a monomer cofeed of 525 grams of acrylic acid, an initiator cofeed of 10.0 grams of sodium persulfate dissolved in 116.0 grams of deionized water, and a chain regulator cofeed of 294.4 grams of sodium hypophosphite monohydrate dissolved in 320.0 grams of deionized water. The three cofeeds were added to the reactor linearly and separately over two hours while maintaining the temperature of the mixture at 90°±1° C. Following the addition of the cofeeds, the mixture was held at 90° C. for another 30 minutes and then cooled to room temperature.

The resulting polymer solution was analyzed by GPC to determine the weight average molecular weight, and by NMR to determine the residual monomer levels and the amount and type of incorporation of the hypophosphorous acid. The data appears in Table I below.

EXAMPLE 2

The same procedure was followed as in Example 1 except that the initial charge of deionized water was 317.0 grams, and a fourth cofeed solution of 386.75 grams of 50 percent by weight sodium hydroxide was used. The data appears in Table I below.

EXAMPLE 3

The same procedure was followed as in Example 1 except that the sodium hypophosphite solution was cofed over 75 minutes from the start of the additions. The data appears in Table I below.

EXAMPLE 4

The same procedure was followed as in Example 3 except that 20.0 grams of sodium persulfate was dissolved in 116.0 grams of deionized water. The data appears in Table I below.

EXAMPLE 5

The same procedure was followed as in Example 3 except that 30.0 grams of sodium persulfate was dissolved in 116.0 grams of deionized water. The data appears in Table I below.

EXAMPLE 6

The same procedure was followed as in Example 3 except that 40.0 grams of sodium persulfate was dissolved in 116.0 grams of deionized water. The data appears in Table I below.

EXAMPLE 7

The same procedure was followed as in Example 3 except that 95.1 grams of a 50 percent by weight solution of sodium hydroxide was added to the reactor. The data appears in Table I below.

EXAMPLE 8

The same procedure was followed as in Example 3 except that 47.5 grams of a 50 percent by weight solution of sodium hydroxide was added to the reactor. The data appears in Table I below.

EXAMPLE 9

The same procedure was followed as in Example 1 except that the chain regulator cofeed was made by dissolving 200.0 grams of sodium hypophosphite monohydrate in 320.0 grams of deionized water. The data appears in Table I below.

EXAMPLE 10

The same procedure was followed as in Example 9 except that the temperature of the reaction was maintained at $86°\pm1°$ C. The data appears in Table I below.

EXAMPLE 11

The same procedure was followed as in Example 9 except that the temperature of the reaction was maintained at $82°\pm1°$ C. The data appears in Table I below.

EXAMPLE 12

The same procedure was followed as in Example 1 except that the initial charge of deionized water was 500.0 grams, no initiator promoter solution was used, the chain regulator cofeed was made by dissolving 135.0 grams of sodium hypophosphite monohydrate in 220.0 grams of deionized water and the temperature of the reaction was maintained at $86°\pm1°$ C. The data appears in Table I below.

EXAMPLE 13

The same procedure was followed as in Example 1 except that the initial charge of deionized water was 550.0 grams, no initiator promoter solution was used, the chain regulator cofeed was made by dissolving 90.0 grams of sodium hypophosphite monohydrate in 172.0 grams of deionized water and the temperature of the reaction was maintained at $86°\pm1°$ C. The data appears in Table I below.

EXAMPLE 14

667 grams of deionized water and 169 grams of maleic anhydride were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 60° C. 184 grams of a 50 percent by weight sodium hydroxide solution was added to the stirred reactor over five minutes. The exotherm resulting from the neutralization of the maleic anhydride raised the temperature of the reactor contents to 80° C. The reaction mixture was further heated to 90° C. Three cofeed solutions were prepared: a monomer cofeed of 650 grams of acrylic acid, an initiator cofeed of 10.0 grams of sodium persulfate dissolved in 116.0 grams of deionized water, and a chain regulator cofeed of 181.0 grams of sodium hypophosphite monohydrate dissolved in 250.0 grams of deionized water. The three cofeeds were started simultaneously. The chain regulator solution was fed into the reactor over 100 minutes and the other cofeeds were fed into the reactor over two hours while maintaining the temperature of the mixture at $90°\pm1°$ C. Following the addition of the cofeeds, the mixture was held at 90° C. for another 30 minutes and then cooled to room temperature. The data appears in Table I below.

EXAMPLE 15

667 grams of deionized water and 127 grams of maleic anhydride were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 60° C. 104 grams of a 50 percent by weight sodium hydroxide solution was added to the stirred reactor over five minutes. The exotherm resulting from the neutralization of the maleic anhydride raised the temperature of the reactor contents to 80° C. The reaction mixture was further heated to 90° C. Three cofeed solutions were prepared: a monomer cofeed of 750 grams of acrylic acid, an initiator cofeed of 10.0 grams of sodium persulfate dissolved in 116.0 grams of deionized water, and a chain regulator cofeed of 120.0 grams of sodium hypophosphite monohydrate dissolved in 310.0 grams of deionized water. The three cofeeds were started simultaneously. The chain regulator solution was fed into the reactor over 100 minutes and the other cofeeds were fed into the reactor over two hours while maintaining the temperature of the mixture at $90°\pm1°$ C. Following the addition of the cofeeds, the mixture was held at 90° C. for another 30 minutes and then cooled to room temperature. The data appears in Table I below.

EXAMPLE 16

COMPARATIVE 400 grams of deionized water was added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 86° C. Four cofeed solutions were prepared: a monomer cofeed of 690 grams of acrylic acid, an initiator cofeed of 10.0 grams of sodium persulfate dissolved in 116.0 grams of deionized water, a neutralizer cofeed of 148.8 grams of 50 percent by weight sodium hydroxide solution was dissolved in 80.0 grams of deionized water, and a chain regulator cofeed of 200.0 grams of sodium hypophosphite monohydrate dissolved in 300.0 grams of deionized water. The four cofeeds were added to the reactor linearly and separately over two hours while maintaining the temperature of the mixture at $86°\pm1°$ C. Following the addition of the cofeeds, the mixture was held at 86° C. for another 30 minutes and then cooled to room temperature. The data appears in Table I below.

EXAMPLE 17

COMPARATIVE

The same procedure was followed as in Example 16 except that no sodium hydroxide was used. The data appears in Table I below.

EXAMPLE 18

500.0 grams of deionized water and 225 grams of maleic anhydride were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 40° C. 184 grams of a 50 percent by weight sodium hydroxide solution was added to the stirred reactor over five minutes. The exotherm resulting from the neutralization of the maleic anhydride raised the temperature of the reactor contents to 80° C. The reaction mixture was further heated to 86° C. Three cofeed solutions were prepared: a monomer cofeed of 525 grams of acrylic acid, an initiator cofeed of 15.69 grams of 75 percent by weight 4,4-Bis Azo(4-cyanovaleric acid) and 6.72 grams of 50 percent by weight sodium hydroxide dissolved in 150.0 grams of deionized water, and a chain regulator cofeed of 200.0 grams of sodium hypophosphite monohydrate dissolved in 300.0 grams of deionized water. The three cofeeds were added to the reactor linearly and separately over two hours while maintaining the temperature of the mixture at 86°±1° C. Following the addition of the cofeeds, the mixture was held at 86° C. for another 30 minutes and then cooled to room temperature. The data appears in Table I below.

EXAMPLE 19

500 grams of deionized water and 213.3 grams of itaconic acid were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 40° C. 184 grams of a 50 percent by weight sodium hydroxide solution was added to the stirred reactor over five minutes. The exotherm resulting from the neutralization of the itaconic acid raised the temperature of the reactor contents to 65° C. The reaction mixture was further heated to 86° C. Three cofeed solutions were prepared: a monomer cofeed of 375.5 grams of acrylic acid, an initiator cofeed of 7.14 grams of sodium persulfate dissolved in 71.4 grams of deionized water, and a chain regulator cofeed of 143.0 grams of sodium hypophosphite monohydrate dissolved in 214.0 grams of deionized water. The three cofeeds were added to the reactor linearly and separately over two hours while maintaining the temperature of the mixture at 86°±1° C. Following the addition of the cofeeds, the mixture was held at 86° C. for another 30 minutes and then cooled to room temperature. The data appears in Table I below.

EXAMPLE 20

500 grams of deionized water and 160.7 grams of maleic acid were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 40° C. 123.8 grams of a 50 percent by weight sodium hydroxide solution was added to the stirred reactor over five minutes. The exotherm resulting from the neutralization of the maleic anhydride raised the temperature of the reactor contents to 80° C. The reaction mixture was further heated to 86° C. Three cofeed solutions were prepared: a monomer cofeed of 307.1 grams of acrylic acid and 68.4 grams of hydroxyethyl acrylate, an initiator cofeed of 7.14 grams of sodium persulfate dissolved in 71.4 grams of deionized water, and a chain regulator cofeed of 143.0 grams of sodium hypophosphite monohydrate dissolved in 214.0 grams of deionized water. The three cofeeds were added to the reactor linearly and separately over two hours while maintaining the temperature of the mixture at 86°±1° C. Following the addition of the cofeeds, the mixture was held at 86° C. for another 30 minutes and then cooled to room temperature. The data appears in Table I below.

EXAMPLE 21

206 grams of deionized water and 30 grams of a 0.1 percent by weight iron sulfate heptahydrate solution were added to a five liter flask equipped with a mechanical stirrer, condenser, thermometer, and inlets for the addition of nitrogen, neutralizing solution, monomer, initiator and sodium hypophosphite solutions. A nitrogen stream was started in the head space and the reactor contents were stirred and heated to 90° C. Four cofeed solutions were prepared: a monomer cofeed of 325 grams of acrylic acid, 175 grams of maleic anhydride and 200 grams of deionized water; an alkaline neutralizer cofeed of 451.6 grams of 50 percent by weight sodium hydroxide and 100 grams of deionized water; an initiator cofeed of 5.0 grams of sodium persulfate dissolved in 80.0 grams of deionized water; and a chain regulator cofeed of 27.6 grams of sodium hypophosphite monohydrate dissolved in 66 grams of deionized water. The four cofeeds were added to the reactor linearly and separately over two hours while maintaining the temperature of the mixture at 90°±2° C. Following the addition of the cofeeds, the mixture was held at 90° C. for another 30 minutes and then cooled to room temperature. The data appears in Table I below.

EXAMPLE 22

400 grams of deionized water and 162.7 grams of maleic anhydride were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 86° C. Three cofeed solutions were prepared: a monomer cofeed of 375.5 grams of acrylic acid, an initiator cofeed of 7.14 grams of sodium persulfate dissolved in 71.4 grams of deionized water, and a chain regulator cofeed of 143.1 grams of sodium hypophosphite monohydrate dissolved in 214 grams of deionized water. The three cofeeds were added to the reactor linearly and separately over two hours while maintaining the temperature of the mixture at 86°±1° C. Following the addition of the cofeeds, the mixture was held at 86° C. for another 30 minutes and then cooled to room temperature. The data appears in Table I below.

EXAMPLE 23

400 grams of deionized water and 162.7 grams of maleic anhydride were added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 40° C. 262.4 grams of a 50 percent by weight sodium hydroxide solution was added to the stirred reactor over ten minutes. The exotherm resulting from the neutralization of the maleic anhydride raised the temperature of the reactor contents to 86° C. Three cofeed solutions were prepared: a monomer cofeed of 375.5 grams of acrylic acid, an initiator cofeed of 7.14 grams of sodium persulfate dissolved in 71.4 grams of deionized water, and a chain regulator cofeed of 143.1 grams of sodium hypophosphite monohydrate dissolved in 214 grams of deionized water. The three cofeeds were added to the reactor linearly and separately over two hours while maintaining the temperature of the mixture at 86°±1° C. Following the addition of the cofeeds, the mixture was held at 86° C. for another 30 minutes and then cooled to room temperature. The data appears in Table I below.

In Table I, values are reported as follows:

"AA/MALAC" are grams of acrylic acid and grams of maleic anhydride used;

"NaHPP" are grams of sodium hypophosphite monohydrate used;

"Temp" is temperature;

"NaOH" are molar equivalents of base added based on the total monomer acids;

"Res. Monomer" are percent of residual monomer based on initial charge;

"Mw" is weight average molecular weight;

"Mono:Di" are the ratio of the amount of phosphorus incorporated as a monoalkyl phosphinate or monoalkyl phosphonate to the amount of phosphorus incorporated as dialkyl phosphinate; and "Unrxted P" is the mole percent of phosphorus, based on the initial charge, which is not incorporated into a polymer.

| Ex. | AA/Malac | NaHPP | Temp | NaOH | Res. Monomer | Mw | Mono:Di | Unrxted P |
|---|---|---|---|---|---|---|---|---|
| 1 | 525/225 | 294.4 | 90° C. | 19.35 | <.01/<.01 | 1600 | 6.4:1 | 48 |
| 2 | 525/225 | 294.4 | 90° C. | 60.00 | <.01/<.01 | 1508 | 1.6:1 | 18 |
| 3 | 525/225 | 294.4 | 90° C. | 19.35 | <.01/<.01 | 1400 | 4.4:1 | 30 |
| 4 | 525/225 | 294.4 | 90° C. | 19.35 | .01/.02 | 1310 | 2.3:1 | 18 |
| 5 | 525/225 | 294.4 | 90° C. | 19.35 | <.01/.03 | 1246 | 1.6:1 | 14 |
| 6 | 525/225 | 294.4 | 90° C. | 19.35 | <.01/.03 | 1184 | 1.3:1 | 14 |
| 7 | 525/225 | 294.4 | 90° C. | 10.00 | <.01/.01 | 1467 | 6.2:1 | 35 |
| 8 | 525/225 | 294.4 | 90° C. | 5.00 | <.01/.01 | 1547 | 6.9:1 | 37 |
| 9 | 525/225 | 200.0 | 90° C. | 19.35 | <.01/<.01 | 2250 | 6.4:1 | 48 |
| 10 | 525/225 | 200.0 | 86° C. | 19.35 | <.01/<.01 | 2200 | 7.8:1 | 47 |
| 11 | 525/225 | 200.0 | 82° C. | 19.35 | <.01/<.01 | 2014 | 9.2:1 | 49 |
| 12 | 525/225 | 135.0 | 86° C. | 19.35 | <.01/<.01 | 2214 | 5.4:1 | 30 |
| 13 | 525/225 | 90.0 | 86° C. | 19.35 | .02/.11 | 2863 | 9.0:1 | 30 |
| 14 | 650/169 | 181.0 | 90° C. | 13.80 | <.01/<.01 | 2075 | 2.0:1 | 23 |
| 15 | 750/127 | 120.0 | 90° C. | 10.00 | <.01/<.01 | 2725 | 1.3:1 | 18 |
| 16* | 690/0 | 200.0 | 86° C. | 19.35 | <.01/<.01 | 1503 | 0.5:1 | 04 |
| 17* | 690/0 | 200.0 | 86° C. | 0 | <.01/<.01 | 1733 | 0.4:1 | 18 |
| 18 | 525/225 | 200.0 | 86° C. | 19.35 | .21/.68 | 2250 | 12.0:1 | 48 |
| 19 | 375/213~ | 143 | 86° C. | 19.35 | <.01/.01* | 3051 | 0.75:1 | 30 |
| 20 | 307/161^ /68⁓ | 143 | 86° C. | 19.35 | <.01/<.01/.01 | 1977 | 7.5:1 | 40 |
| 21 | 325/175 | 28 | 90° C. | 75 | .36/1.6 | 3870 | 11.7:1 | 17 |
| 22 | 375/163 | 143 | 86° C. | 0 | .02/.81 | 1861 | 12.8:1 | 31 |
| 23 | 375/163 | 143 | 86° C. | 100 | <.01/1.6 | 1462 | 2.1:1 | 1 |
| 24 | 265/112 | 100 | 86° C. | 0 | .30/1.1 | 2017 | 9.8:1 | 48 |

*Comparative Examples
~Itaconic Acid
^ Maleic Acid
⁓ Hydroxy Ethyl Acrylate

EXAMPLE 24

200 grams of deionized water was added to a five liter flask equipped with a mechanical stirrer, condenser, thermometer, and inlets for the addition of nitrogen, monomer, initiator and sodium hypophosphite solutions. A nitrogen stream was started in the head space and the reactor contents were stirred and heated to 86° C. Three cofeed solutions were prepared: a monomer cofeed of 265.3 grams of acrylic acid, 112.5 grams of maleic anhydride, and 194.5 grams of deionized water; an initiator cofeed of 5.0 grams of sodium persulfate dissolved in 50.0 grams of deionized water; and a chain regulator cofeed of 100.0 grams of sodium hypophosphite monohydrate dissolved in 150.0 grams of deionized water. The three cofeeds were added to the reactor linearly and separately over two hours while maintaining the temperature of the mixture at 86°±1° C. Following the addition of the cofeeds, the mixture was held at 86° C. for another 30 minutes and then cooled to room temperature. The data appears in Table I below.

The data Table 1 demonstrates that using a $C_3$-$C_8$ monoethylenically unsaturated dicarboxylic acid in the polymerization of a monoethylenically unsaturated monocarboxylic acid increases the amount of the incorporated phosphorus present as monoalkyl phosphinate and monoalkyl phosphonate. This effect can be seen when the $C_3$-$C_8$ monoethylenically unsaturated dicarboxylic acid is present as a heel charge or when it is cofed. The effect is also seen when the $C_3$-$C_8$ monoethylenically unsaturated dicarboxylic acid is unneutralized, partially neutralized, fully neutralized independently from when the neutralization takes place i.e. prior to or during polymerization.

We claim:

1. A water soluble polymer mixture containing polymeric monoalkyl phosphinates, polymeric monoalkyl phosphonates and polymeric dialkyl phosphinates wherein at least 40 percent of the incorporated phosphorus is present as polymeric monoalkyl phosphinate and polymeric monoalkyl phosphonate.

2. The polymer mixture of claim 1 wherein at least 50 percent of the incorporated phosphorus is present as polymeric monoalkyl phosphinate and polymeric monoalkyl phosphonate.

3. The polymer mixture of claim 1 wherein at least 60 percent of the incorporated phosphorus is present as polymeric monoalkyl phosphinate and polymeric monoalkyl phosphonate.

* * * * *